United States Patent [19]

Niwa et al.

[11] Patent Number: 4,912,170
[45] Date of Patent: Mar. 27, 1990

[54] PROCESS FOR PRODUCING A MODIFIED STYRENE POLYMER

[75] Inventors: Tadashi Niwa; Masayuki Kato; Yoshio Taguchi, all of Saitama; Chihiro Imai, Kanagawa; Tokuo Makishima, deceased, late of Tokyo; by Nobuko Makishima, legal representative, Saitama, all of Japan

[73] Assignee: Toa Nenryo Kogyo K.K., Tokyo, Japan

[21] Appl. No.: 288,981

[22] Filed: Dec. 22, 1988

[30] Foreign Application Priority Data

Dec. 26, 1984 [JP] Japan .................. 59-273120

Related U.S. Application Data

[60] Continuation of Ser. No. 167,824, Mar. 14, 1988, abandoned, which is a division of Ser. No. 820,536, Jan. 17, 1986, abandoned.

[51] Int. Cl.$^4$ .................. C08F 8/00; C08F 8/42; C08F 12/12
[52] U.S. Cl. .................. 525/337; 525/106; 525/326.1; 525/333.3; 525/333.4; 525/333.5; 525/340; 525/342; 525/343; 525/344; 525/350; 525/353; 525/354; 525/359.5; 525/359.6; 525/366
[58] Field of Search .............. 525/106, 326.1, 333.3, 525/333.4, 333.5, 337, 340, 342, 343, 344, 350, 353, 354, 359.5, 359.6, 366

[56] References Cited

U.S. PATENT DOCUMENTS 2,572,557 10/1951 Butler .................. 525/333.3
2,694,702 11/1954 Jones .................. 525/333.4
3,234,196 2/1966 Leavitt .................. 525/333.3
3,427,364 2/1969 Shaw et al. .................. 525/333.3
4,029,706 6/1977 Crosby .................. 525/333.5
4,230,836 10/1980 Canterino .................. 525/333.3

FOREIGN PATENT DOCUMENTS 0095389 7/1975 Japan .................. 525/333.4
0142004 11/1980 Japan .................. 525/366
0142005 11/1980 Japan .................. 525/366

Primary Examiner—Herbert J. Lilling

[57] ABSTRACT

This invention relates to a p-methyl styrene polymer represented by the following formula:

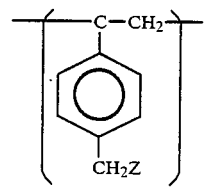

Z denotes a group such as a functional group. Poly p-methylstyrene (PPMS) is lithiated by reaction with n-butyllithium. The lithiated PPMS is used to prepare polymers containing functional groups. As an example, a solution of PPMS (MW 260,000), 1.0 g in 20 ml of cyclohexane, was reacted with n-butyllithium, 8.5 mmol, and tetramethylethylenediamine, 8.7 mmol, for 20 hours to obtain a precipitate. The precipitate was dissolved in THF, and $CO_2$ was blown into the solution. The solution was washed with an aqueous solution of HCl and dropped into methanol to obtain a solid polymer having carboxyl group functionality.

20 Claims, No Drawings

PROCESS FOR PRODUCING A MODIFIED STYRENE POLYMER

This is a continuation of application Ser. No. 167,824 filed 3/14/88, which is a R.60 Division of U.S. Ser. No. 820,536 filed 1/17/86, both abandoned.

The present invention relates to a process for producing a functionalized styrene polymer. More particularly, it relates to a process for producing a precursor for p-methylstyrene polymer having a substituent or, as referred to hereinafter, a substituting group.

A styrene polymer having a substituting group, especially a functional group, is useful as a functional polymer. Heretofore, a variety of styrene polymers having a functional group have been produced by copolymerizing styrene with an unsaturated monomer having a functional group, or by reacting a styrene polymer with a saturated or unsaturated compound having a functional group. For example, polymeric ions and polymeric chelating agents have been produced by the steps of reacting a styrene polymer with a halomethyl ether or the like, thereby introducing a halomethyl group into the aromatic ring of the styrene polymer, and reacting the resulting product with a compound having a functional group, thereby introducing a desired functional group.

The above-mentioned processes are effective in attaching a functional group to a styrene polymer, but they involve difficulty in introducing selectively a functional group into a specific position in the aromatic ring of the styrene polymer. Moreover, according to them, the type of functional group that can be attached is limited.

There is a known method of introducing a substituting group into the aromatic ring by lithioating cross-linked polystyrene with n-butyllithium and reacting the resulting product with a variety of reagents. [Journal of Organic Chemistry, Vol. 41, No. 24, p. 3877, (1976).] According to this literature, the lithioation takes place at both the meta position and the para position of the aromatic ring, and the m-/p-ratio is 2/1. The reaction needs heating, and the efficiency of the lithioation is only about 23%. The abovementioned report also describes a process for introducing a substituting group into the para position of the aromatic ring by bromating cross-linked polystyrene in the presence of a thallium (III) salt, reacting the resulting product with n-butyllithium as mentioned above, and finally reacting the resulting product with a reagent as mentioned above.

Therefore, according to the conventional process, it is difficult to introduce selectively and efficiently a substituting group into a specific position, particularly the para position, of the aromatic ring of polystyrene. Moreover, the conventional process requires complicated processes.

It is an object of the present invention to provide a process for producing a precursor to be transformed into a styrene polymer having a substituting group at the para position of the aromatic ring.

SUMMARY OF THE INVENTION

A process for producing a functionalized styrene polymer, particularly one having the repeating units represented by the following formula, which comprises reacting a p-methylstyrene polymer having the repeating units of p-methylstyrene skeleton with an organic lithium compound and thereafter with a delithiuming reagent.

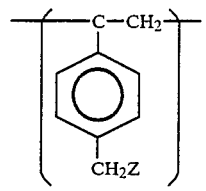

where Z denotes a group such as a functional group.

DETAILED DESCRIPTION p-methylstyrene polymer

The p-methylstyrene polymer used in this invention is a polymer having the repeating units of p-methylstyrene (referred to as PMS hereinafter) skeleton. The typical example is poly-PMS.

The poly-PMS is obtained by polymerizing PMS or a methylstyrene mixture containing more than 95%, preferably more than 97% of PMS. The polymerization is accomplished by solution polymerization in an inert hydrocarbon solvent such as benzene or toluene, by suspension polymerization in a solution containing a suspension stabilizer such as calcium phosphate, polyvinyl alcohol, and hydroxyethyl cellulose, or by emulsion polymerization in an aqueous medium containing a proper surface active agent. The polymerization may be performed in the presence of a free-radical type, anionic type, or cationic type polymerization catalyst. Thermal polymerization may also be used. The poly-PMS that can be used in this invention has a weight-average molecular weight of several thousands to several millions. The poly-PMS may also be cross-linked.

Polymers other than poly-PMS that can be used in this invention include random or block copolymers of PMS with a monomer such as olefin, styrene, and siloxane which is inert to the organic lithium compound used in the invention.

Organic lithium compound

The organic lithium compound is represented by the formula RLi, where R is an alkyl group having 1 to 12 carbon atoms. Examples of the compound include methyl lithium, ethyl lithium, n-butyl lithium, sec-butyl lithium, tert-butyl lithium, n-pentyl lithium, tert-pentyl lithium, hexyl lithium, octyl lithium, and dodecyl lithium. Preferably among them is butyl lithium.

Reaction of PMS polymer with organic lithium compound

The reaction of PMS polymer with the organic lithium compound may be accomplished in a solvent inert to the organic lithium compound. Examples of the solvent include hydrocarbons such as hexane, heptane, octane, cyclohexane, benzene, toluene, and xylene; and ethers such as diethyl ether, dibutyl ether, tetrahydrofuran, and dioxane. The PMS polymer is dissolved in or swollen with one of these solvents before the reaction with the organic lithium compound. The reactivity of the organic lithium compound may be enhanced by using an amine such as N,N,N',N'-tetramethylethylenediamine.

The reaction temperature may range from −70° C. to the boiling point of the solvent used. Reaction temperatures above room temperature are desirable for efficient lithioation. The amount of the organic lithium may be established as desired regardless of the amount of the p-methylstyrene skeleton units, so that the degree of lithioation can be adjusted as desired. The amount of the amine may be equivalent to or in excess of the amount of the organic lithium. The reaction time is usually 0.1 to 100 hours, depending on the reaction temperature. Extending the reaction time will increase the degree of lithioation.

The thus prepared lithioated PMS polymer, which is the precursor relating to the present invention, is so reactive as to readily react with moisture in the air. Therefore, the direct confirmation of its formation is difficult to perform; but the indirect confirmation can be performed by the reaction with carbon dioxide or trimethylchlorosilane, which is a well-known method.

The precursor prepared in the way mentioned above is readily changed by reaction with a variety of reagents into a styrene polymer having a substituting group at the para position as shown in the formula above.

In the above-mentioned formula, Z denotes a substituting group, more particularly, a hydrogen atom; hydrocarbon group; a substituting group containing carbonyl group; a substituting group containing a hydroxyl group; or a substituting group containing sulfur, phosphorus, or silicon. To be more specific, Z denotes a $C_1$–$C_{20}$ hydrocarbon group (e.g., alkyl, alkenyl, cycloalkyl, aryl, and aralkyl); a substituting group containing a carbonyl group (e.g., —COOH, —CHO, —COR, and —CONHR) (where R is the same hydrocarbon group as above); a substituting group containing a hydroxyl group (e.g., —C($R^1$)($R^2$)OH and —CH$_2$CH(OH)R) (where $R^1$, $R^2$, and R are the same hydrocarbon groups as above, and $R^1$ and $R^2$ may be the same or different); a substituting group containing boron (e.g., —B(OH)$_2$); a substituting group containing sulfur (e.g., —SH, —SR, and —SO$_2$H) (where R is the same hydrocarbon group as above); a substituting group containing phosphorus (e.g., —PR$_2$) (where R is the same hydrocarbon group as above); or a substituting group containing silicon (e.g., —SiR$_3$ and —SiR$_2$X) (where R is the same hydrocarbon group as above, and X is a halogen atom).

The styrene polymer having the above-mentioned substituting group can be produced by reacting the precursor obtained according to the process of this invention with a delithiuming reagent mentioned below.

Where the substituting group is a hydrogen atom, the delithiuming reagent is H$_2$O. Where the substituting group is a hydrocarbon group, the delithiuming reagent is RX (where X is a halogen atom). Where the substituting group is —COOH, the delithiuming reagent is CO$_2$ and then a proton donor (e.g., water, acid, and alcohol). Where the substituting group is —CHO, the delithiuming reagent is R$_2$NCHO (where R is a lower alkyl group). Where the substituting group is —COR, the delithiuming reagent is RCN. Where the substituting reagent is —CONHR, the delithiuming reagent is RNCO. Where the substituting group is —C($R^1$)($R^2$)OH, the delithiuming reagent is $$R^1CR^2 \atop \| \atop O$$

Where the substituting group is —CH$_2$CH$_9$(OH)R, the delithiuming reagent is

Where the substituting group is —B(OH$_2$), the delithiuming reagent is B(OR)$_2$ and then a proton donor (where R is the same hydrocarbon group as above). Where the substituting group is —SH, the delithiuming reagent is sulfur (S$_8$). Where the substituting group is —SR, the delithiuming reagent is RSSR. Where the substituting group is —SO$_2$H, the delithiuming reagent is SO$_2$ and HCl. Where the substituting group is —PR$_2$, the delithiuming reagent is R$_2$PCl. Where the substituting group is —SiR$_3$, the delithiuming reagent is R$_3$SiX (where X is a halogen atom). Where the substituting group is —SiR$_2$X, the delithiuming reagent is R$_2$SiX$_2$.

The reaction of the above-mentioned precursor with the above-mentioned delithiuming reagent may be accomplished by brining the two into contact with each other in the presence or absence of an inert medium. The inert medium that can be used includes hydrocarbons such as pentane, hexane, heptane, octane, cyclohexane, benzene, toluene, and xylene; and ethers such as diethyl ether, dibutyl ether, tetrahydrofuran, and dioxane.

The reaction conditions for the above-mentioned precursor and the above-mentioned delithiuming reagent may be different depending on the type of reagent and medium used. No specific conditions can be established unconditionally. Usually, the reaction temperature ranges from −70° C. to +150° C., and the reaction time ranges from 1 to 100 hours. The amount of the substituting group to be attached may be properly controlled by selecting proper reaction conditions, such reaction conditions are readily determined by those skilled in the art.

The process of this invention makes it possible to selectively produce a precursor, or an intermediate, to be changed into a styrene polymer having a substituting group at the para position as represented by the above-mentioned formula. The styrene polymer, especially the one having a functional group, is useful as a functional polymer.

EXAMPLES

The invention is described in more detail with reference to the following examples. The products obtained in the examples were identified as follows:

IR: Measured by the film method or KBr method using an infrared spectrophotometer, Model A-3, made by Nippon Bunko Co., Ltd.

$^1$H NMR: Measured using a 20 wt.% solution of sample in CDCl$_3$ with Model 360A (60 MHz) made by Varian Co., Ltd. Measuring condition: 20° C.

$^{13}$C NMR: Measured using a 20 wt.% solution of sample in CDCl$_3$ with a Fourier transformation type NMR spectrophotometer, Model XL-200, made by Varian Co., Ltd. Temperature: 60° C., 60° pulse, pulse interval: 30 sec., integration: 900 times.

EXAMPLE 1

In a flask, with the air therein replaced with nitrogen, were placed 1.0 g of poly-PMS (PPMS) having an $\overline{M}w$ of 260,000 (containing 8.5 unit mmol of p-methylstyrene skeleton units) and 20 ml of cyclohexane, followed by stirring for dissolution. To the solution was added a mixture composed of 5.7 ml (8.5 mmol) of 1.5M solution of n-butyllithium in hexane and 1.3 ml (8.7 mmol) of tetramethylenediamine (TMEDA), followed by reaction at room temperature for 20 hours. The precipitates thus obtained were identified as the precursor of this invention. The supernatant liquid was removed and 20 ml of tetrahydrofuran (THF) was added to dissolve the precipitates. Carbon dioxide gas was blown into the solution for 5 minutes. The reaction liquid was washed with a 10% aqueous solution of hydrochloric acid and then added dropwise to methanol to form precipitates. The precipitates were dried at 80° C. in vacuo. IR analysis indicated the presence of carboxyl groups. [IR adsorption spectrum: 3,600–2,800 cm$^{-1}$ (—OH), 1,750 cm$^{-1}$ (>C=O).]

EXAMPLES 2 TO 6

In a flask, with the air therein replaced with nitrogen, were placed 1.0 g of PPMS and 20 ml of cyclohexane, followed by stirring for dissolution. To the solution was added an equimolar mixture of n-butyllithium and TMEDA as shown in Table 1, followed by reaction at room temperature for 20 hours. To the reaction liquid containing the precipitates of the precursor of this invention was added (CH$_3$)$_3$SiCl in an amount equivalent to twice the molar amount of n-butyllithium used, followed by reaction for 1 hour. The reaction liquid was washed with a 10% aqueous solution of hydrochloric acid and then added dropwise to methanol to form precipitates. The precipitates were dried at 80° C. in vacuo and subjected to IR analysis and NMR analysis. IR analysis indicated the presence of (CH$_3$)$_3$Si— groups. The amount of (CH$_3$)$_3$Si— groups introduced was calculated from the integration ratio obtained by the $^1$H NMR analysis (see Table 1). The structural skeleton was confirmed by $^{13}$C NMR analysis.

IR: 1,250 cm$^{-1}$, 850 cm$^{-1}$ [(CH$_3$)$_3$Si—]

$^1$H NMR [δ(ppm)]: 7.02–6.10 (aromatic ring), 2.15

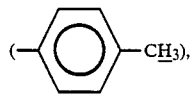

2.5–1.05

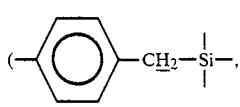

main chain

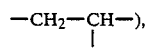

−0.05 (—Si—CH$_3$).

$^{13}$C NMR:

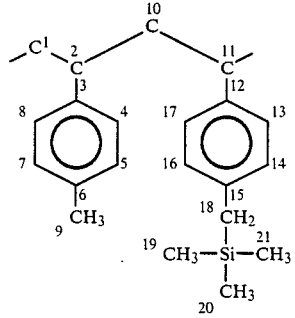

δ value ((ppm). TMS reference)

| 1 | 40.12 | 8 | 127.51 | 15 | 136.90 |
| 2 | 46.93–42.68 | 9 | 20.90 | 16 | 128.39 |
| 3 | 142.57 | 10 | 40.12 | 17 | 127.51 |
| 4 | 127.51 | 11 | 46.93–42.68 | 18 | 26.40 |
| 5 | 128.39 | 12 | 142.46 | 19 | ⎫ |
| 6 | 134.37 | 13 | 127.51 | 20 | ⎬ −1.81 |
| 7 | 128.39 | 14 | 128.39 | 21 | ⎭ |

TABLE 1

| Example | PPMS (unit mmol) | n-BuLi (mmol) | TMEDA (mmol) | Amount of Me$_3$Si groups introduced (unit mol %) |
| --- | --- | --- | --- | --- |
| 2 | 8.5 | 2.1 | 2.1 | 14.0 |
| 3 | 8.5 | 4.2 | 4.2 | 33.5 |
| 4 | 8.5 | 6.3 | 6.3 | 36.1 |
| 5 | 8.5 | 8.5 | 8.5 | 40.1 |
| 6 | 8.5 | 25.4 | 25.4 | 47.2 |

EXAMPLES 7 TO 13

PPMS, n-butyllithium, and TMEDA were reacted with one another in the same manner as in Example 5, except that the reaction time was changed as shown in Table 2, whereby there were obtained the precipitates of the precursor of this invention. The precipitates were reacted with (CH$_3$)$_3$SiCl in the same manner as in Examples 2 to 6. The results are shown in Table 2.

TABLE 2

| Example | Reaction time (hour) | Amount of Me$_3$Si groups introduced (unit mol %) |
| --- | --- | --- |
| 7 | 0.5 | 6.1 |
| 8 | 1.0 | 9.6 |
| 9 | 2.0 | 14.6 |
| 10 | 5.0 | 30.2 |
| 11 | 7.5 | 33.5 |
| 12 | 15 | 38.6 |
| 5 | 20 | 40.1 |
| 13 | 25 | 41.5 |

EXAMPLE 14

PPMS, n-butyllithium, and TMEDA were reacted with one another in the same manner as in Example 5 to give the precipitates of the precursor of this invention. The precipitates were reacted with 10.0 mmol of allyldimethylchlorosilane for 1 hour. The precipitates were recovered in the same manner as in Example 2 to 6. $^1$H NMR analysis indicated the presence of allyldimethylsilyl groups. The integration ratio indicated that the amount of allyldimethylsilyl groups introduced was 43.9 unit mol %.

$^1$H NMR [δ(ppm)]: 7.02–6.10 (aromatic ring), 4.94, 4.72 (—CH=CH$_2$), 2.25

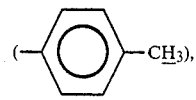

2.08–1.05

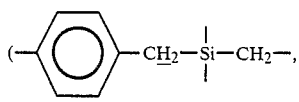

main chain $-CH_2-CH-$),

–0.05

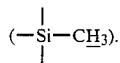

What is claimed is:

1. A process for producing a para-substituted styrene polymer which comprises reacting a paramethylstyrene polymer with an organic lithium compound and thereafter with a delithiuming reagent to produce a polymer having repeating units represented by the following formula:

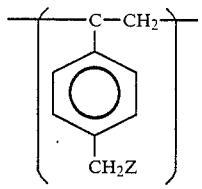

wherein Z denotes a substituting group.

2. The process of claim 1 wherein said paramethylstyrene polymer is selected from the group consisting of polyparamethylstyrene, and random and block copolymers of polyparamethylstyrene.

3. The process of claim 2 wherein said random and block copolymers of polyparamethylstyrene comprise comonomers inert to said organic lithium compound, said comonomers selected from the group consisting of olefins, styrene and siloxane.

4. The process of claim 1 wherein said organic lithium compound is represented by the formula RLi wherein R is an alkyl group having 1 to 12 carbon atoms.

5. The process of claim 4 wherein said alkyl group is selected from the group consisting of methyl, ethyl, butyl, pentyl, hexyl, octyl and dodecyl.

6. The process of claim 1 wherein said paramethylstyrene polymer is polyparamethylstyrene and said organic lithium compound is butyl lithium.

7. The process of claim 1 wherein the reaction of said paramethylstyrene polymer and said organic lithium compound is accomplished in a solvent inert to said organic lithium compound.

8. The process of claim 1 wherein Z is selected from a hydrogen atom, a $C_1$–$C_{20}$ hydrocarbon group referred to as R, or groups containing a carbonyl group, a hydroxyl group, sulfur, boron, phosphorus and silicon.

9. The process of claim 8 wherein R is selected from the group consisting of alkyl, alkenyl, cycloalkyl, aryl and aralkyl.

10. The process of claim 8 wherein said carbonyl group is selected from —COOH, —CHO, —COR and —CONHR.

11. The process of claim 8 wherein said hydroxyl group is selected from the groups consisting of —$CR_1R_2OH$ and —$CH_2CHOHR$ wherein $R_1$, $R_2$ and R may be the same or different.

12. The process of claim 8 wherein said boron group is —$B(OH)_2$.

13. The process of claim 8 wherein said sulfur group is selected from the group consisting of —SH, —SR and —$SO_2H$.

14. The process of claim 8 wherein said phosphorous group is —$PR_2$.

15. The process of claim 8 wherein said silicon group is selected from the group consisting of —$SiR_3$ and —$SiR_2X$, wherein X is a halogen atom.

16. The process of claim 1 wherein said delithiuming reagent, D, is selected such that if Z is hydrogen then D is $H_2O$, if Z is R then D is RX, wherein X is a halogen atom, if Z is —COOH then D is $CO_2$ followed by a proton donor selected from the group consisting of water, acid and alcohol, if Z is —CHO then D is $R_3NCHO$ wherein $R_3$ is a lower alkyl group, if Z is —COR then D is RCN, if Z is —CONHR then D is RNCO, if Z is —$CR_1R_2OH$ then D is

if Z is —$CH_2CH_9(OH)R$ then D is

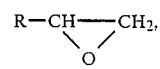

if Z is —$B(OH)_2$ then D is $B(OR)_2$ followed by a proton donor selected from the group consisting of water, acid and alcohol, if Z is —SH then D is sulfur, if Z is —SR then D is RSSR, if Z is —$SO_2H$ then D is $SO_2$ and HCl, if Z is —$PR_2$ then D is $R_2PCl$, if Z is —$SiR_3$ then D is $R_3SiX$ wherein X is a halogen atom, if Z is —$SiR_2X$ then D is $R_2SiX_2$.

17. The process of claim 16 where said reaction is conducted in an inert medium.

18. The process of claim 17 wherein said inert medium is selected from the group consisting of hydrocarbons and ethers.

19. The process of claim 1 further comprising the additional activation of said organic lithium compound with an amine.

20. The process of claim 19 wherein said amine is selected from N,N,N',N'-tetramethylethylenediamine and tetramethylenediamine.

* * * * *